United States Patent [19]

Anspon

[11] 4,255,315

[45] Mar. 10, 1981

[54] METHOD OF MAKING A HIGH IMPACT POLYSTYRENE

[75] Inventor: Harry D. Anspon, Sewickley, PA

[73] Assignee: United States Steel Corporation, Pittsburgh, Pa.

[21] Appl. No.: 23,227

[22] Filed: Mar. 23, 1979

Related U.S. Application Data

[63] Continuation-in-part of Ser. No. 868,553, Jan. 11, 1978, abandoned.

[51] Int. Cl.$^3$ .............................................. C08K 5/01
[52] U.S. Cl. ........................... 260/33.6 AQ; 525/243; 525/316
[58] Field of Search .................... 260/33.6 AQ, 880 R

[56] References Cited

U.S. PATENT DOCUMENTS

| | | | |
|---|---|---|---|
| 3,428,712 | 2/1969 | Carrock | 260/880 R |
| 3,506,740 | 4/1970 | Dempsey | 260/33.6 AQ |
| 3,996,311 | 12/1976 | Westphal | 260/880 R |

*Primary Examiner*—Paul R. Michl

*Attorney, Agent, or Firm*—William L. Krayer

[57] ABSTRACT

An otherwise conventional two-stage (mass suspension polymerization system for making impact polystyrene is modified in several respects: (a) the rubber (about 7% to about 10% of the polymerization charge) to be dissolved in styrene has a cis content greater than 97%, (b) a portion, i.e. 5–15%, of the free-radical catalyst to be used is added at the beginning of the mass polymerization stage, i.e. at about 235°–250° F. after dissolving the rubber in the styrene, and (c) the addition of the major portion (about at least 85%) of the mercaptan chain regulator added is made at the time of the initiation of the mass polymerization stage when the temperature first reaches the temperature employed for mass polymerization (such temperature selected from the range of 235°–250° F.). The rubber used should have a viscosity as a 5% solution in toluene of 70–95 cps at 25° C. Mineral oil, preferably high boiling, containing at least 20% saturated naphthenic hydrocarbons, is added in an amount of about 1.3% to about 2.3% of the reaction charge. The resulting product is exceptionally high in impact resistance.

3 Claims, No Drawings

METHOD OF MAKING A HIGH IMPACT POLYSTYRENE

This is a continuation-in-part of my copending application Serial No. 868,553, filed January 11, 1978 now abandoned.

BACKGROUND OF THE INVENTION

Packaging is a major area for use and consumption of impact polystyrene resins. Articles of impact polystyrene for packaging are often formed by extrusion of the polystyrene into sheet followed by multicavity thermoforming of the sheet into cups or tubs with deep draw thermoforming. For such service the polystyrene must be capable of being extruded into sheet with good impact properties in the machine direction and in the direction transverse of the sheet, and should exhibit nearly balanced elongation and impact values in both sheet directions. This sheet also must be capable of being deep drawn by having sufficient and uniform melt strength to permit the formation of containers with uniform wall thickness changes. The extruded sheet must also be free of gels and its rubber particle size distribution should be uniform so as to form a sheet of uniform appearance.

Desirably the impact polystyrene resin should exhibit a high rubber efficiency, i.e. provide a high level of impact resistance for a given increment of rubber present. It is advantageous from the manufacturer's standpoint that the impact properties should increase continuously with rubber level to as high a rubber level as possible. Further, for use in sheet forming and a variety of packaging applications, impact polystyrene having a high rubber level should possess good impact strength and elongation when blended with crystal polystyrene to lower rubber levels.

In the past it has been difficult to obtain an increase in impact strength when rubber levels exceeded six percent. Polystyrenes with greater than 6% rubber seldom could be blended down with crystal polystyrene to a 6% rubber level to obtain a polymer with impact equivalent to that made directly at 6% rubber by grafting. This "blend back" capability is important since crystal polystyrene has a shorter manufacturing cycle time than impact polystyrene. Hence a given reactor volume can produce more resin in a given time by using blend back techniques to employ the reactor volume to produce more crystal polystyrene and less impact polystyrene. A useful high rubber level impact polystyrene must not only possess a high rubber level but this rubber level must be effective in increasing impact so that when it is diluted with crystal polystyrene useful high impact polystyrenes are obtained.

The rubber particle itself also must be able to resist deformation in extrusion shearing to avoid appearance changes in machine and transverse directions. High cis polybutadiene is commercially available with a molecular structure and branching capable of giving lower rubber solution viscosity at a given rubber level than polybutadiene polymerized with a lithium catalyst and having about 10% vinyl, and 35% trans polybutadiene. However, while the latter compound has been polymerized into useful high impact polystyrenes with deep draw characteristics, i.e. high melt strength, the high cis rubbers which form lower rubber solution viscosities at a given weight of rubber have had limited use in polymerization with styrene to make polystyrene suitable for thermoformed packaging since their deep draw characteristics suffer due to limited melt strength. The melt strength of an impact polystyrene appears to be related to the molecular weight of the rubber, the crosslinking of the rubber particle and the grafting of the rubber particle with high molecular weight polystyrene.

In manufacturing high impact polystyrene, mass polymerization of the rubber polystyrene solution is employed even with solutions which are subsequently suspension polymerized. However, in rubber-styrene solution systems which are subsequently suspension polymerized a high viscosity solution is more difficult to stir and break down into high impact polystyrene bead sizes of 0.1 to 1 mm which can be handled in manufacturing equipment such as centrifuges and dryers than a low viscosity solution. Thus conventional stirring equipment forces a practical limitation on rubber content, molecular weight of the polystyrene, and conversion level of styrene into polystyrene at suspension because of viscosity constraints. When rubber is dissolved in styrene without a chain regulator present or only a limited amount present, there is a considerable risk of the formation of gels in the rubber solution, particularly if a high molecular weight rubber is employed. The further the conversion proceeds without a chain regulator such as t-dodecyl mercaptan present, the greater the risk of gels and very high viscosity rubber solutions. As the polystyrene rubber solution is heated thermal polymerization proceeds but only a limited amount of grafting takes place. Addition of catalyst can be made to promote grafting but catalyst addition to a rubber solution in polystyrene increases the polymerization rate of the rubber-styrene solution and the rate at which the viscosity increases. Catalyst addition also reduces the rubber particle size by the increase of styrene grafting to the rubber. If too much catalyst is added the rubber particle size can become too small for optimum impact properties and the rate of polymerization in large commercial reactors of 5000 gal. to 15,000 gal. size may become too rapid for control of temperature with reactor cooling jackets. Even worse, the rate of viscosity increase may be so great that it is difficult to suspend the reaction mass at the time that suspension may be effected with the stirring systems employed. The thermal polymerization method employed for the mass polymerization has the advantage that it proceeds at a controlled rate of conversion dependent on temperature and with polymer molecular weight formation which is dependent on temperature and secondarily on conversion. With thermal polymerization the phase inversion and the viscosity changes occurring can be observed. Also, the rate of reaching a conversion point which is beyond phase inversion and which still possesses a manageable viscosity for suspension is controllable. It would seem possible to avoid these viscosity limitations by early suspension; however, too early suspension can lead to excessively high moisture in the beads obtained from suspension and incomplete drying in plant dryers. Additionally, the phase inversion step must be completed to assure rubber particle size control to a uniform and reproducible size distribution.

The addition of catalyst in the mass stage can cause poor temperature control, form rubber particles which are too small in size (too many rubber particles below 1 micron in diameter) and make difficult the detection and selection of the proper suspension time.

At some point, it is essential to add catalyst to effect rapid polymerization, cross-linking, and grafting of styrene and rubber. Otherwise, grafting and cross-linking is limited and properties of the impact polystyrene suffer. Also, catalyst is required to shorten the cycle time for conversion of the remaining styrene to polymer. Catalyst addition is normally made after suspension in order to handle the high viscosity polymer as a bead and to control temperature of the beads as a slurry in water.

SUMMARY OF THE INVENTION

I have invented a method of making polystyrene which has a consistently high impact strength, i.e. an Izod of at least 3.0 when measured on an injection mold sample, and which is suited for fabrication into sheet capable of deep draw thermoforming. The novelty, and usefulness of my invention resides in the formation of a very high impact polystyrene suitable for thermoforming into deep draw containers. A critical combination of materials and steps not previously disclosed and not readily apparent nor even appearing possible or of possible significance is required to obtain the unusual properties of the impact polystyrene of this invention. These materials and steps are:

1. a cis content in the polybutadiene rubber of greater than 97%;
2. a portion of, i.e. 5–15%, of the total free-radical type catalyst employed is added at the beginning of the mass polymerization stage, following solution of rubber in styrene;
3. the addition of the major portion (about at least 85%) of mercaptan chain regulator added is made at the time of the initiation of the mass polymerization stage when the temperature first reaches the temperature employed for mass polymerization (such temperature selected from the range of 235°–250° F.);
4. the rubber content is 7–10% of the polymerization charge;
5. the rubber employed has a viscosity as a 5% solution in toluene of 70–95 cps at 25° C.;
6. a high boiling mineral oil containing at least 20% naphthenic hydrocarbons is used, comprising about 1.3–2.3% of the polymerization charge;
7. the remaining catalyst is added at the time of suspension.

The cis-polybutadiene rubber employed possesses a molecular configuration and branching allowing high rubber levels to be obtained without reaching unmanageable viscosities in large commercial stirred vessels. The high cis content provides a rubber with a limited level of vinyl content and hence a reduced tendency to graft and cross-link. This rubber must be present as a relatively high molecular weight grade so that the limited grafting and cross-linking effected with a small portion of catalyst in the mass polymerization step is effective. The low molecular weight grades of high cis-polybutadiene are not useful in obtaining the high impact polystyrene of this invention. The amount of catalyst added during the mass polymerization step is a small portion (5–15%) of the total catalyst eventually charged following completion of the suspension stage of polymerization.

The major portion (about at least 85%) of the mercaptan chain regulator is added at the beginning of the mass polymerization stage. There is none or only a minor portion of mercaptan chain regulator added at any other time such as at solution of the rubber or up to the onset of the temperature used for mass polymerization or prior to suspension. The addition of mercaptan may be delayed up to 15 minutes after reaching the mass polymerization temperature selected but further delay is not desirable due to the risk of gel formation and too high viscosities in the mass polymerization. However, it is remarkable that addition of the mercaptan at the very start of mass polymerization (when conversion is only around 2%) is effective in achieving the results obtained. Conversion after 15 minutes usually does not exceed 5%, thus the criticality of mercaptan addition time is shown. The addition of the mercaptan from the start of rubber dissolving does not achieve the results of this invention nor does the addition of 30% of the mercaptan at rubber dissolving. It is believed that a small amount of high molecular weight polymer must be formed before the bulk of the mercaptan (about at least 85%) is added. The high molecular weight polystyrene forms by polymerization occurring at the low temperatures prevailing during solution of the rubber and up to the point of reaching the mass polymerization temperature employed. It is likely that other methods of insuring the presence of a small amount of a high molecular weight polystyrene before mercaptan is added would give the results of this invention. It is also critical that the rubber employed possesses a high molecular weight as the results of this invention are not obtained with rubber possessing 40 cps viscosity as a 5% solution in toluene.

While it is important that at least about 85% of the mercaptan is added at the start of mass polymerization a portion may be added at the time the mass is suspended to further adjust viscosity of the final polymer.

To obtain the results of this invention it is necessary that a small portion of the total catalyst be added near the start of the mass polymerization. While some variation in the total catalyst amount is possible, 5–15% of the total catalyst ultimately used should be added at the beginning of the mass polymerization stage. As mentioned previously, a small portion of catalyst is needed to obtain these results, but too much catalyst results in excessive polymerization rates. While the time of addition of the small portion of catalyst may be delayed slightly after reaching mass polymerization temperature it is desirable to add the catalyst close to the same time as the principal amount of the mercaptan; preferably however, the mercaptan addition should precede the addition of catalyst. The catalyst should not be added prior to reaching mass polymerization to obtain the results of this invention. The catalyst should have a half-life of about ½ hour to about 10 hours at 235°–250° F. measured in benzene or chlorobenzene. Typical peroxy catalysts which may be used include 1,1-di-tert-butyl peroxy-3,3,5-trimethylcyclohexane
   tert-butyl peroxy isopropylcarbonate
t-butyl peracetate
t-butyl perbenzoate
4,4-di-tert-butyl peroxy valeric acid-n butyl ester
2,2-di-tert-butyl peroxy butane
di-cumyl peroxide
t-butyl cumyl peroxide
1,3-bis (tert-butyl peroxyisopropyl) benzene
di-tert-butyl peroxide
tert-butyl peroxy-3,5,5-trimethylhexoate The principal portion of the catalyst is added after suspension. If any small part of the mercaptan is added at suspension it is preferable to add it before the catalyst which means it should be added shortly before suspension. Generally, it is desirable to incorporate as much rubber as can be employed effectively in increasing impact strength of impact polystyrene. Viscosity parameters of commercial agitators restrict the rubber levels to 7–11%, with the preferred range being 8–10% rubber. (The necessary high molecular weight rubber also results in high viscosities.) Impact strengths exceeding 3.0 ft. lbs./inch are obtained at 8% rubber. Higher rubber levels bring the Izod impact to as high as 4.5 ft. lbs./inch at 10% rubber. Such impact values in the past have been associated with ABS resins and not impact polystyrenes. Under actual end item molding conditions articles of this type of impact polystyrene perform as well as those made with ABS in resistance to impact.

To obtain the impact values described and to have an impact polystyrene suitable for sheet with good impact and good elongation and with good thermoforming characteristics, it is necessary to have 1.3–2.3% of a high boiling mineral oil preferably containing a large amount, i.e. at least 20%, of saturated naphthenics (cyclic hydrocarbons). The preferred range of mineral oil is 1.3–2.3% with best results obtained at 1.8–2.0% mineral oil. For food grade packaging purposes the mineral oil is saturated and contains no aromatic compounds. Preferably the mineral oil will have no substantial volatilization below 600° F.

The viscosity of the rubber solution at suspension has the prior described practical limitations, but the melt viscosity of the final resin also has limitations which govern its satisfactory use in extrusion of sheet suited for deep draw thermoforming. If the melt index falls as low as 1.2 the extrusion of a sheet with balanced impact properties is difficult. If the melt index becomes as high as 5, the sheet does not have the melt strength for deep draw thermoforming on high speed equipment. The melt index is controlled by the amount of chain regulator (such as t-dodecyl mercaptan) present. However, as noted the addition of chain regulator also has an effect on rubber solution viscosity. The amount of mercaptan and its addition point is important in obtaining the results of this invention. Large variations of mercaptan from the levels employed will not obtain the results of this invention. Desirably variations of t-dodecyl mercaptan of less than 10% from those described in this invention should be used. Other regulators performing the same function as the t-dodecyl mercaptan amounts of this invention could be used, however. These regulators should be selected on an equivalent molar basis to the t-butyl mercaptan. While other mercaptans could be used as chain regulators, I prefer to use t-dodecyl mercaptan. Examples of other mercaptans include lauryl, nonyl, decyl, and similar alkyl mercaptans. Aryl mercaptans such as thiophenol or thionaphthol also might be used. The chain regulator selected should be added in an amount to cause its performance to equate to that of t-dodecyl mercaptan which means for mercaptans that an equimolar amount of mercaptan to that of t-dodecyl mercaptan should be employed in place of t-dodecyl mercaptan. Other chain regulators for polymerization such as organic disulfides, carbon tetrachloride, and styrene dimer might be used in place of t-dodecyl mercaptan if their performance is equivalent to that of t-dodecyl mercaptan.

The final melt viscosity also is affected by the amount and type of mineral oil present. The rather narrow limits on mineral oil and the type of mineral oil used are important to good performance of the product in respect to impact strength, elongation, and fabrication on high speed thermoforming equipment.

The process of this invention produces polystyrene resins of particular utility in forming sheet suitable for deep draw thermoforming. For such sheet to have such utility, orientation effects as shown by sheet samples from the direction of extrusion and perpendicular to the direction of extrusion should be minimized; the variation in values between samples from the respective directions will be no more than about 30% below the larger value. Especially desirable resins are those in which the difference in values is no more than 20% of the higher value. As can be seen from the description given hereafter, it is possible to achieve a difference of less than 10% for the values of elongation at failure (all measured values being at least about 50) and tensile strength at failure with the difference in Izod impact values on extruded thin sheet being less than 20%, the actual Izod value on extruded thin sheet in each direction being at least about 2.4. Unless thermoforming is performed with a sheet of balanced properties, the packaging item produced from the sheet will reflect at least a portion of the imbalance in properties of the original sheet. This imbalance leads to splitting and easy fracture of the packaging product along planes related to the orientation of the original sheet.

The total catalyst employed desirably should be within 15% and preferably 10% of the amount of t-butyl perbenzoate used. Catalysts other than t-butyl perbenzoate should be on an equivalent mole basis to t-butyl perbenzoate. However, it is important that only 5–15% of the total catalyst employed be added at the start of the mass polymerization step.

The rubber employed typically contains an anti-oxidant or a combination of anti-oxidants to limit gel formation in the rubber during its production. Additional anti-oxidants may be added in the process particularly prior to extrusion into pellets. For optimum properties in the impact polystyrene, especially its ability to withstand repeated extrusion without loss of impact or elongation in sheet, the anti-oxidant system should be chosen with an eye to its effect on these characteristics. Too much anti-oxidant should not be added prior to polymerization as it may slow polymerization. A system of 0.5% Ionol and 0.5% Polygard in the rubber with an additional amount of 0.25% Ionol added prior to extrusion may be useful with the resins of this invention. The performance of the resins during fabrication is affected by the particular polymerization recipe, conditions for polymerization of the recipe and the processing additives used with the resin. Typical operating conditions for extrusion are melt temperatures of about 400°–500° F. and pressures of 1000–2500 psi. The flow characteristics of the resins will be a combination of flow rate and melt viscosity and melt strength so that the resin flows at an acceptable rate and produces sheet of uniform gauge (normal gauges for packaging are 0.02 to 0.12 inches). A feature of the resins of this invention is that the physical properties of recycled resin are substantially the same for a first, second, third or even fourth or more recycle.

The initial thermal polymerization of the styrene and polybutadiene rubber is conducted at temperatures from about 235° F. up to about 250° F. During this polymerization, the initial solution of styrene and rubber undergoes a phase inversion by which the styrene-polystyrene material becomes the continuous phase with small droplets of styrene-rubber phase material as the dispersed phase. Agitation during this stage of polymerization affects the size of the dispersed insoluble particles in the final resin. This size is controlled to give the optimum gloss and impact strength; weight average particle sizes of 2 to 5 microns are particularly desirable. The thermal polymerization proceeds principally by the formation of secondary free radicals rather than primary free radicals.

Once the polymerization reaches a viscosity of about 3,000 centipoises, the system can be suspended in water with the use of suspension agents. This region will generally permit the polymerization to be conducted without excessive risks of premature gelation and blockage of the reactors. Calcium phosphate in combination with an alkali melt salt of an alcohol ester sulfate is typical of such suspension agents. The polymerization is continued at temperatures of up to about 270° F. until the residual monomer level is less than 0.3% by weight of resin. An advantage of the polymerization with the aqueous suspension is that the polymerizing mixture is in the form of small droplets surrounded by water as a heat transfer medium. The viscosity of the suspension remains essentially constant while it is agitated during this latter stage of polymerization. This is especially desirable for the polymerization of styrene with polybutadienes because very high viscosities in the polymerizing mixture of styrene and rubber occur after phase inversion and during polymerization to 99.7% conversion. Once the suspension is formed, oil soluble organic peroxide catalysts are added to promote graft polymerization between the rubbers and styrene and to cause the polymerization to go to completion. Catalyst addition at this time has the further benefit that the presence of the water phase in the reactor allows the viscosity of the organic phase to be increased substantially while the water phase contains the dispersed organic phase and permits agitation at the relatively low viscosity of the suspension in water.

Having described the invention and its useful ranges, modifications within the limits outlined should be apparent to those skilled in polystyrene polymerization art. For example, the rate of stirring and the stirring means employed controls the shearing obtained when the phase inversion is occurring. This shearing helps set the rubber particle size which desirably should be in the range of 1–10 microns and most desirably 3–5 microns in diameter.

EXAMPLES

The following examples illustrate the practice of the invention. The description which follows may be considered a control run for purposes of comparison with my invention. It appears as Run #1 in Table I; other runs differ from it as shown in Table I.

Run #1

A solution is made by dissolving approximately 672 lbs. of polybutadiene rubber in 11,104 lbs. of styrene monomer and 8.86 lbs. of t-dodecyl mercaptan. The solution is stirred at 160° F. to completely dissolve the rubber, filtered, and heated to 250° F. (121° C.) where the polymerization is conducted until approximately 30% conversion.

A high boiling hydrocarbon oil plasticizer (216 lbs.) is added. This oil has an initial boiling point of at least 600° F., a viscosity of about 350 SSU and has about 60% paraffinic carbon atoms and 40% naphthenic carbon atoms. It also contains a small amount of an oxidation inhibitor, a-tocopherol. Thereafter, the polymerizing mixture is suspended in water with a suspension system of calcium phosphate and a sodium salt of an alcohol sulfate ester as a surfactant. A t-butyl perbenzoate peroxide catalyst (11.08 lbs.) is added and the polymerization is continued at 230° F. (110° C.) while the suspension is stirred. Toward the end of polymerization, the temperature is increased to 270° F. (132° C.) until polymerization is complete, e.g., 0.3% or less of residual volatiles. The polymerization is conducted under an inert nitrogen atmosphere.

Fine beads of polymer are recovered from the suspension. These are extruded and cut into pellets. The pellets are then injection molded or extruded into thin sheets.

The polystyrene resin composition also contains processing additives and stabilizers.

TABLE I

| # | Mineral Oil Wt. % | Rubber Stereo Structure | Rubber Visc. | Rubber Level % | Cat. at Mass Polym. | TDM Addition | Melt Flow | Mass Temp. prior to Susp. | Injection Molded Sample Izod | Injection Molded Sample Elongation | Extruded Thin Sheet MD/ARD Izod | Extruded Thin Sheet MD/ARD Elong. | Comments |
|---|---|---|---|---|---|---|---|---|---|---|---|---|---|
| 1 | 1.4 | 10% 1,2 vinyl | high | 5.6 | No | D | 2.1 | 250F | 2.1 | 45 | 1.6/1.5 | 50/51 | Control - conventional sheet resin |
| 2 | 1.4 | 10% 1,2 vinyl | " | 5.6 | No | D | 2.1 | 250F | 2.1 | 40 | — | — | About 10% cyclics in mineral oil marginal elong. |
| 3 | 1.4 | 97% cis | " | 5.6 | No | D | 2.9 | 250F | 2.2 | 57 | 1.6/1.6 | 56/66 | Similar to control but poor on automated thermoforming |
| 4 | 1.8 | — | " | 6.2 | No | M | 3.7 | 250F | 3.5 | 47 | 1.8/1.2 | 16/8 | Poor sheet properties |
| 5 | 1.3 | — | " | 6.2 | No | D | 2.5 | 250F | 3.1 | 54 | 1.8/1.7 | 66/50 | Too weak for fabrication, i.e. for continuous deep draw thermoforming because of low melt strength |
| 6 | 1.8 | half 10% 1,2 vinyl, half 1.0% 1,2 vinyl (97% cis) | " | 6.2 | No | M | 3.1 | 250F | 3.2 | 38 | 1.4/1.0 | 18/8 | Poor elongation |
| 7 | " | 97% cis | " | 7.5 | No | 30% D 70% M | 4.9 | 250F | 3.0 | 43 | 2.3/2.2 | 62/56 | Poor Izod; high melt flow |
| 8 | " | — | " | 6.2 | Yes | M | 2.8 | 250F | 3.4 | 39 | 1.6/1.0 | 51/48 | Similar to control but not better as sheet |
| 9 | " | — | " | 8.0 | Yes (2 × 3) | M | 1.6 | 240F | 4.4 | 46 | — | — | Reaction too fast |
| 10 | " | — | " | 9.0 | Yes | M | 2.2 | 240F | 4.0 | 57 | 2.7/2.7 | 67/72 | Excellent sheet composition |
| 11 | " | — | " | 9.0 | Yes | M | 1.7 | 240F | 4.3 | 53 | 2.6/2.5 | 68/71 | Excellent sheet composition |
| 12 | " | — | " | 9.0 | Yes | M | 1.4 | 235F | 4.6 | 59 | — | — | Excellent sheet composition, marginal melt flow |
| 13 | " | — | " | 9.0 | Yes (15 min. later) | M+15 | 0.2 | 235F | 4.0 | 32 | — | — | Low melt flow |
| 14 | " | — | " | 9.0 | No | M | 1.4 | 235F | 4.6 | 56 | — | — | Marginal melt flow |
| 15 | " | — | " | 8.0 | Yes | M | 1.7 | 240F | 4.0 | 49 | 2.4/2.4 | 74/72 | Excellent sheet composition |
| 16 | " | — | " | 8.0 | Yes | M | 2.7 | 240F | 4.6 | 45 | — | — | Duplicate of 15 |
| 17 | " | — | " | 8.0 | Yes* | M | 3.6 | 240F | 3.0 | 55 | — | — | Poor Izod |
| 18 | " | — | 35 | 9.0 | Yes | M | 0.44 | 240F | 5.0 | 48 | — | — | Low melt flow |
| 19 | " | — | 35 | 9.0 | No | M | 0.5 | 235F | 4.9 | 55 | — | — | Low melt flow |
| 20 | " | — | 35 | 10.0 | No | M | 0.1 | 235F | 5.2 | 57 | — | — | Low melt flow |
| 21 | " | 10% 1,2 vinyl | high | 6.2 | No | M | 2.7 | 250F | 3.3 | 46 | 2.0/1.0 | 30/7 | MD/AMD results unacceptable |
| 22 | " | 97% cis | " | 7.5 | Yes | M | 3.1 | 250F | 3.1 | 51 | 2.3/2.3 | 65/60 | Excellent sheet composition |
| 23 | " | — | " | 7.5 | Yes | M | 3.1 | 250F | 3.0 | 68 | 2.2/2.1 | 70/78 | Excellent sheet composition |
| 24 | " | — | " | 8.0 | No | M | 2.5 | 250F | 5.4 | 60 | 2.6/2.4 | 68/61 | Excellent sheet composition |
| 25 | " | — | " | 8.0 | No | M | 2.4 | 250F | 3.6 | 51 | — | — | Similar to 15 |
| 26 | " | — | " | 8.0 | Yes | M | 2.6 | 240F | 4.8 | 55 | — | — | Similar to 15 |
| 27 | " | — | " | 8.0 | Yes | M | 2.1 | 235F | 4.8 | 60 | — | — | Similar to 15 |
| 28 | " | — | " | 8.0 | Yes | M | 2.4 | 235F | 3.8 | 57 | — | — | Similar to 15 |
| 29 | " | — | " | 8.0 | Yes | M | 3.0 | 235F | 4.6 | 62 | — | — | Similar to 15 |
| 30 | " | — | " | 8.0 | Yes | M | 2.9 | 235F | 3.9 | — | — | — | Similar to 15 |
| 31 | " | — | " | 8.0 | Yes (at 230F) | M | 2.3 | 235F | 4.1 | 57 | — | — | Similar to 15 |
| 32 | " | — | " | 8.0 | Yes (at 230F) | M | 2.5 | 235F | 4.3 | 54 | — | — | Similar to 15 |
| 33 | " | — | " | 8.0 | Yes (15 min. delay) | M+15 | 1.5 | 235F | 4.4 | 55 | — | — | Satisfactory sheet product; melt flow marginal |
| 34 | " | — | " | 8.0 | Yes (30 min. delay) | M+30 | 0.4 | 235F | 4.0 | 64 | — | — | Poor melt flow |
| 35 | " | — | " | 8.0 | Yes | M | 0.8 | 235F | 4.3 | 57 | — | — | Poor melt flow |

TABLE I-continued

| | Mineral Oil Wt. % | Rubber Stereo Structure | Rubber Visc. | Rubber Level % | Cat. at Mass Polym. | TDM Addition | Melt Flow | Mass Temp. prior to Susp. | Injection Molded Sample Izod | Injection Molded Sample Elongation | Extruded Thin Sheet MD/ARD Izod | Extruded Thin Sheet MD/ARD Elong. | Comments |
|---|---|---|---|---|---|---|---|---|---|---|---|---|---|
| 36 | | — | " | 8.0 | No | M | 2.3 | 235F | 4.0 | 52 | — | — | Satisfactory sheet product |
| 37 | | — | " | 10.0 | No | M | 0.47 | 235F | 4.8 | 42 | — | — | Poor melt flow |
| 38 | | — | " | 9.5 | No | M | 0.18 | 235F | 4.0 | 34 | — | — | Poor melt flow |
| 39 | | — | " | 9.5 | No | M | 0.4 | 235F | 4.2 | 53 | — | — | Poor melt flow |

*3.57 lbs. di-t-butyl peroxide

The notations D, M, and M+15 mean, respectively, the time of dissolution, the time of the initiation of mass polymerization, and the time of initiation of mass polymerization plus fifteen minutes.

While there is a number of different variables presented in Table I, it is clear that runs 10, 11, 12, 15, 16, and 25-32 are excellent sheet forming and extrusion resins. These materials all were made by the method outlined above, and as particularly set forth in the following claims.

I claim:

1. Method of making polystyrene useful in sheet forming applications comprising:
   (a) preparing a polymerization charge comprising about 7% to about 10% polybutadiene rubber having a cis content of at least 97%, and having a viscosity as a 5% solution in toluene of 70-95 cps at 25° C., about 1.3% to about 2.3% of a high boiling mineral oil containing at least 20% saturated naphthenic hydrocarbons, about 0 to about $0.62 \times 10^{-4}$ mole mercaptan chain regulator per mole of styrene and the balance styrene,
   (b) elevating the temperature of the charge to at least about 235° F. and below 250° F. and adding thereto about $0.27 \times 10^{-4}$ mole to about $0.80 \times 10^{-4}$ mole free radical peroxy catalyst per mole of styrene, said catalyst having a half-life of from about ½ hour to about 10 hours at 235°-250° F.,
   (c) adding to the charge about $3.5 \times 10^{-4}$ mole to about $4.73 \times 10^{-4}$ mole of mercaptan chain regulator per mole of styrene within fifteen minutes after the initiation of mass polymerization on reaching a temperature selected from within the range of 235°-250° F.,
   (d) maintaining the temperature of the polymerization charge between about 235° C. and 250° C. until phase inversion is complete and a suitable viscosity for suspension is reached,
   (e) suspending the polymerization reaction mixture in water,
   (f) adding about $4.55 \times 10^{-4}$ mole to about 5.89 mole of a free radical peroxy catalyst per mole of styrene, and
   (g) continuing the polymerization at temperatures of up to about 270° F. until at least 99.7% complete.

2. Method of claim 1 in which the mercaptan chain regulator is t-dodecyl mercaptan.

3. Method of claim 1 in which the catalyst is t-butyl perbenzoate.

* * * * *